United States Patent

[11] 3,558,828

[72] Inventors Pierre R. L. Marty
Paris;
Roger L. Dousset, Plessis-Robinson, France

[21] Appl. No. 746,515
[22] Filed July 22, 1968
[45] Patented Jan. 26, 1971
[73] Assignee International Standard Electric Corporation
New York, N.Y.
a corporation of Delaware
[32] Priority July 21, 1967
[33] France
[31] 115,138

[54] ELECTRONIC SCANNERS
9 Claims, 9 Drawing Figs.

[52] U.S. Cl. .......... 179/18
[51] Int. Cl. .......... H04q 3/24
[50] Field of Search .......... 179/18.6T

*Primary Examiner*—William C. Cooper
*Attorneys*—C. Cornell Remsen, Jr., Delbert P. Warner, Walter J. Baum, Paul W. Hemminger, Charles L. Johnson, Jr., James B. Raden and Marvin N. Chaban

ABSTRACT: In a large capacity common-controlled telephone network utilizing crosspoint matrix switching, a scanning and testing system is provided. The present scanner reads the condition of subscriber line conditions and most importantly detects changes in condition by means of a display contact and a transformer associated with each crosspoint.

Figure 6:
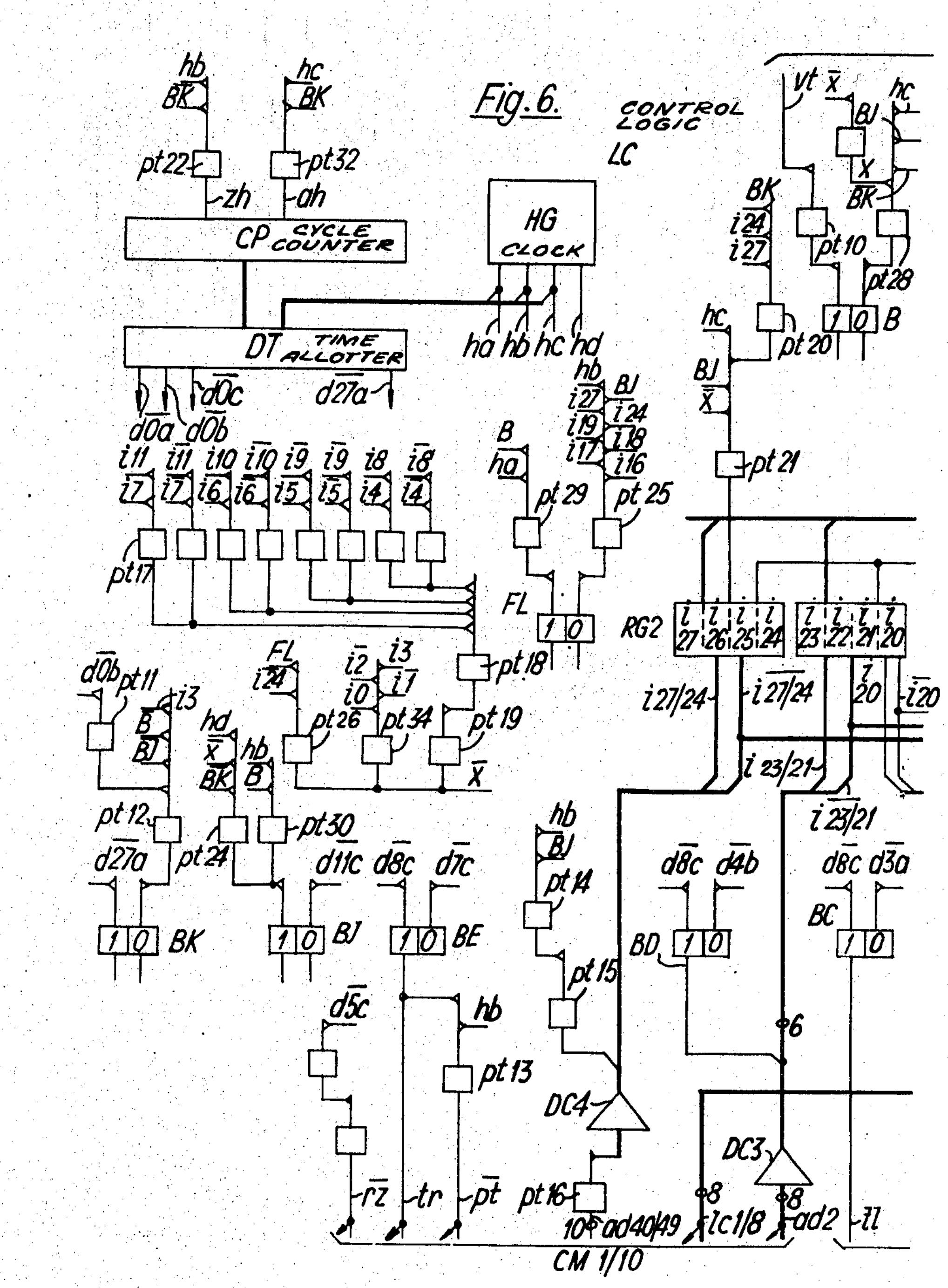

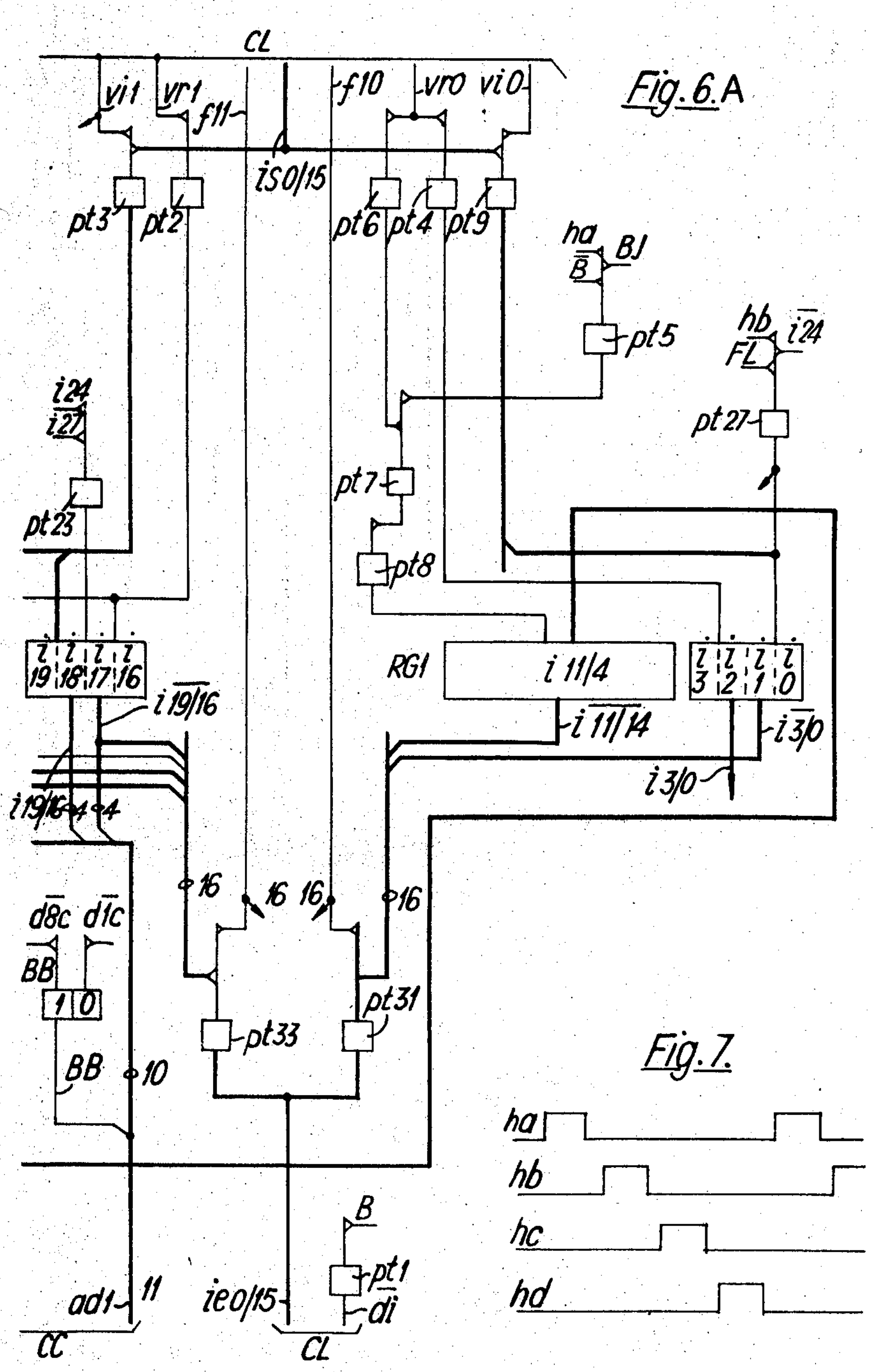
Fig. 6.A, Fig. 7.

ELECTRONIC SCANNERS

The present invention concerns improvements to electronic scanners, and, more particularly, an electronic scanner which makes it possible to interrogate selectively a large number of circuits or individual units and to obtain the information relating to the condition in which these circuits or units are.

This scanner is intended, namely, for interrogating and for reading the condition of the individual units of subscribers' lines, within a telephone switching system, but this application is not specifically limited thereto and is capable of use in any switching system, for scanning any electric circuit or unit of analogous type.

In the case of a telephone system, the scanning of the individual units of the subscribers' lines has for main purpose the detection the changes of condition of the lines and to signal such changes to the exchange common units.

A telephone line is connected to its individual unit each time that no service is required. It can then be "looped," when the station handset is lifted, or, "not looped," when the station handset is replaced. A free line is "not looped." When the subscriber lifts his handset, the line becomes "looped." This change of condition, which characterizes a calling line, must be detected and signalled to the exchange. Subsequently, the call is handled and the line is disconnected from its individual unit. The common units in the exchange receive the called line number and establish the call, if the called line is free. On conclusion of the call, the calling line is disconnected from the common units and connected again to its individual unit. It remains "looped" and is to be considered as busy, but not calling. When the subscriber replaces his handset, the line becomes "not looped." This new change of condition must also be detected and notified to the exchange, in order that the line ceases to be considered as busy. Other cases of operation are provided, but they bring back to the two types of condition changes just described above.

To make it possible to establish whether a line has changed condition, it is necessary to compare its present condition with the prior condition. In the U.S. Pat. application No. 711,580, filed Mar. 8, 1968 by the applicants, entitled "Improvements to selection systems for circuits or electrical equipment," there has been provided for that purpose a subscriber-line individual unit comprising essentially a saturable transformer, making it possible to observe the present condition of the line. A set of contacts is used to indicate the prior condition of the line. The transformer has at least three windings, one winding through which flows the line-loop-current, when this line is "looped," one interrogation winding, and one reading winding. According as to whether the line is or is not "looped" the transformer is or is not saturated; when a current impulse is applied to the interrogation winding, the reading winding either does not or does provide a voltage; this indicates the present condition of the line. The set of contacts is open when the line is free and is initially "not looped." It is closed when the line has just been disconnected from the common units of the exchange and is still "looped."

Such an individual unit responds well indeed to the needs for the detection of changes of condition, but it requires a scanner capable of scanning at the same time both saturable transformers and contacts. The present invention concerns a scanner in which both these functions are integrated, so as to obtain an economic gain. It also concerns a scanner in which the information, provided by the scanning of these transformers and these contacts, is combined in a manner that the changes of condition be detected and signalled to the exchange common units.

Moreover, still in the case of a telephone system, the subscribers' lines are very numerous (many thousands) and they must be scanned at relatively close intervals (some hundreds of milliseconds). Because of the great number of individual units, the circuits of the scanner are of large dimensions and the length of the wiring limits their speed of operation. This operation speed must however be such as to make it possible to respect the scanning frequency required. The invention has also for object, therefore, a scanner of great capacity which has a relatively high speed of operation, obtained nevertheless economically, through a judicious distribution of the functions to be performed.

Finally, for evident reasons of flexibility in its use, a scanner must be capable not only to scan in succession the individual units, but also to be orientated, at one's request, onto any designated unit and to begin the scanning starting from the latter, or, to read the condition only of this designated unit. The invention concerns also a scanner which meets these requirements in most simple manner.

One feature of the invention is to provide an electronic scanner having the form of a matrix made up of columns and rows defining crosspoints and comprising namely: one conductor per column; means for selectively connecting a column conductor to a column current generator; a principal conductor and an auxiliary conductor per row; means for selectively connecting the conductors of one row to a row current generator; a detection transformer per each row, having its primary winding connected between the row current source and the row auxiliary conductor; individual units assigned each to a crosspoint of the matrix; the primary winding of a saturable transformer of an individual unit connected, at each crosspoint, between the column conductor and the corresponding row principal conductor; a first reading-circuit common to a row and to which are connected the secondary windings of the saturable transformers assigned to the row considered; a display contact of an individual unit connected at each crosspoint, between the column conductor and the corresponding row auxiliary conductor; and a second reading circuit common to a row and to which is connected the secondary winding of the detection transformer of this row; these various elements are so arranged that when the scanner has to provide the condition of an individual unit assigned to a crosspoint of the matrix, the appropriate column conductor should be connected to the column current generator, the two appropriate row conductors should be connected to the row current generator, a current flows through the column conductor, the primary winding of the saturable transformer of the considered individual unit and the row principal conductor, a voltage should be or should not be induced to the secondary winding terminals of this saturable transformer, according to whether it is saturated or not; it being detected by the first reading circuit; a current flows or does not flow through the column conductor, the display contact, the row auxiliary conductor and the primary winding of the row detection transformer, a voltage should be or should not be induced to the secondary winding terminals of the detection transformer, it being detected by the second reading circuit, so that finally the two reading circuits should provide outgoing signals indicating the condition of the individual unit.

Of course, the expressions "row" and "column" are used arbitrarily in order to designate the two axes of a matrix and they can be permuted without it being a limitation to the scope of the present invention. It is also possible to permute the functions of the principal conductors and row auxiliary conductors.

According to another feature of the invention, to each crosspoint of the matrix are assigned $m$ individual units, and, there will be provided: one principal conductor and $m$ auxiliary conductors per row; $m$ detection transformers per row; $m$ primary windings of $m$ saturable transformers connected, at each crosspoint, between the column conductor and the row principal conductor; $m$ reading circuits common to a row and to which are connected, respectively, the $m$ secondary windings of the $m$ saturable transformers assigned to each crosspoint of the row; $m$ display contacts connected, at each crosspoint, between the column conductor and the $m$ row auxiliary conductors; $m$ other reading circuits, common to a row and to which are connected, respectively, the secondary windings of the $m$ row detection transformers; these elements being so arranged that, one column and one row being selected, the $2 \times m$ reading circuits should provide signals indicating what are the conditions of $m$ individual units at the same time, which multiplies by $m$ the scanning speed without however necessitating a corresponding increase of the complexity of the scanner's circuits.

According to another feature of the invention, the rows are distributed into $p$ groups of $n$ rows, and there will be provided $p$ row units comprising each a row current source and means for selectively connecting this source to one of the $n$ rows of the group, which in other terms amounts to making up $p$ submatrices having each its own row circuits, but having the same column circuits, which makes it possible to proceed, simultaneously, with $p$ reading operations, one in each submatrix, indicating each $m$ individual units as is specified in the foregoing feature; this increases still further the scanning speed without it being necessary to increase the complexity of the column circuits.

According to another feature of the invention, each of the $p$ row units comprises also a reading register receiving the outgoing signals from the submatrix row reading circuits and storing the concerned $m$ individual units' reading results, as was specified above, until it is possible to process these results.

Another feature of the invention is a control logic comprising, namely, an address register displaying the identity of a crosspoint of the matrix as well as a time allotter operating per cycles and providing, during a cycle, the various necessary signals for controlling the execution of operations which relate to the reading of condition of one or several $m$ individual units assigned to the crosspoint whose identity is stored into the address register.

According to another feature of the invention, the cycle of the time allotter comprises two parts: a first part during which the time allotter provides the necessary signals for controlling the current-supply of one column conductor and of the conductors of a row of each submatrix, as well as for controlling the storing of the reading results by the reading registers of the various submatrices row units; and a second part during which the reading results of the various submatrices are processed in succession in the aim of the detecting and signalling the changes of condition.

According to another feature of the invention, the duration of the time allotter cycle is constant and a started cycle is always accomplished in full; the row and column circuits of the matrix always have therefore all this duration at their disposal for accomplishing their operation and then restoring to rest condition; this makes it possible to obtain reliable operation.

According to another feature of the invention, during the second part of the time allotter cycle, a part of the address contained in the address register is used jointly with a first time-signal for interrogating the reading register of a row unit and to read the corresponding reading result which gets written into an analysis register of the control logic, and is immediately subject to an analysis through the circuit of a change of condition detector, the result of this analysis then conditions the sending to the address register of an order to step forward, obtained from a second time signal and having as its result the increase by one unit of the said address part so that this latter provides the number of the next row unit to be interrogated; these two time signals are repeated, at least as many times as there exist row units, this makes it possible to interrogate them in succession if there is no change of condition; whereas, if a change of condition is detected, the address remains the same and the same row unit is interrogated in repeated fashion until the end of the time allotter cycle.

According to another feature of the invention, when the address part designating the row unit to be interrogated provides the number of the last one among them, the order to step forward is inhibited and the ls last row unit is interrogated in repeated fashion until the end of the time allotter cycle.

According to another feature of the invention, if the control logic has to read the condition of the individual units of only one particular crosspoint, means are provided for simulating the detection of a change of condition and inhibit thus the order to step forward, the corresponding row unit being interrogated in repeated fashion until the end of the time-allotter cycle.

According to another feature of the invention, when the time allotter reaches the end of an operation cycle and if no real or simulated change of condition has been detected, the address contained in the address register is modified, by the restoring to zero of the address part which provides the row unit number and by the addition of a unit to another address part which provides the column number; whereas all the elements of the control logic are restored into their initial condition so that a new reading and analyzing operation should be undertaken, during a new full cycle of the time allotter.

According to another feature of the invention, when the time allotter reaches the end of an operation cycle and if a real or simulated change of condition has been detected, the address contained in the address register is held, as well as the reading results recorded in the analysis register; and the control logic suspends then its operation by producing a signal indicating that it holds useful information—information stored by the address register and the analysis register.

According to another feature of the invention, when the address part which provides the column number is the address of the last column to be scanned, means are provided for simulating a change of condition, at the end of the next cycle of the time allotter, so as to make the scanning to stop, these means will also provide particular signals which will indicate that this stopping is effected, at end of the scanning, when not any change of condition has been detected.

Figure 1:
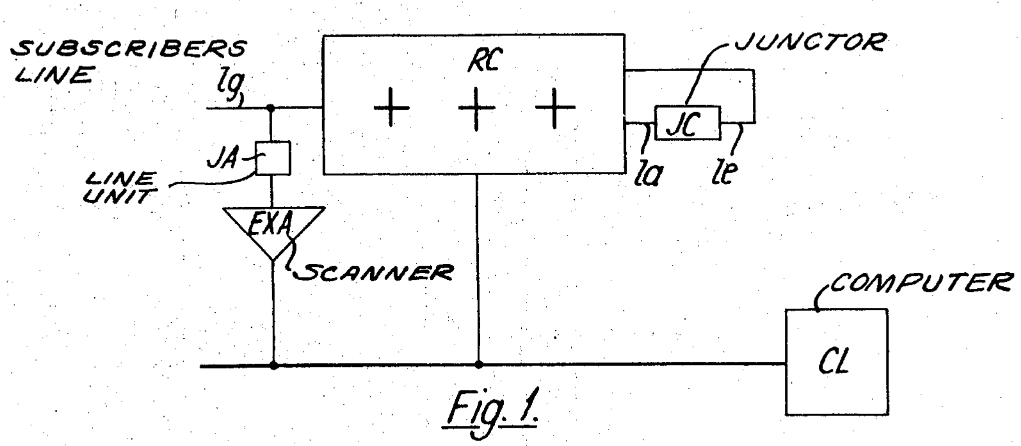
Figure 2:
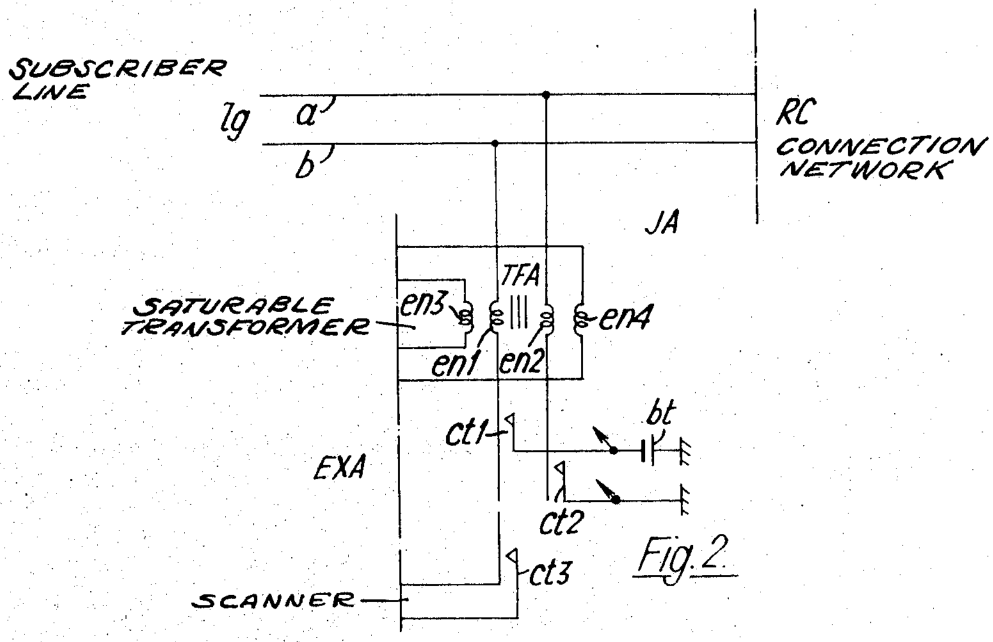
Figure 3:
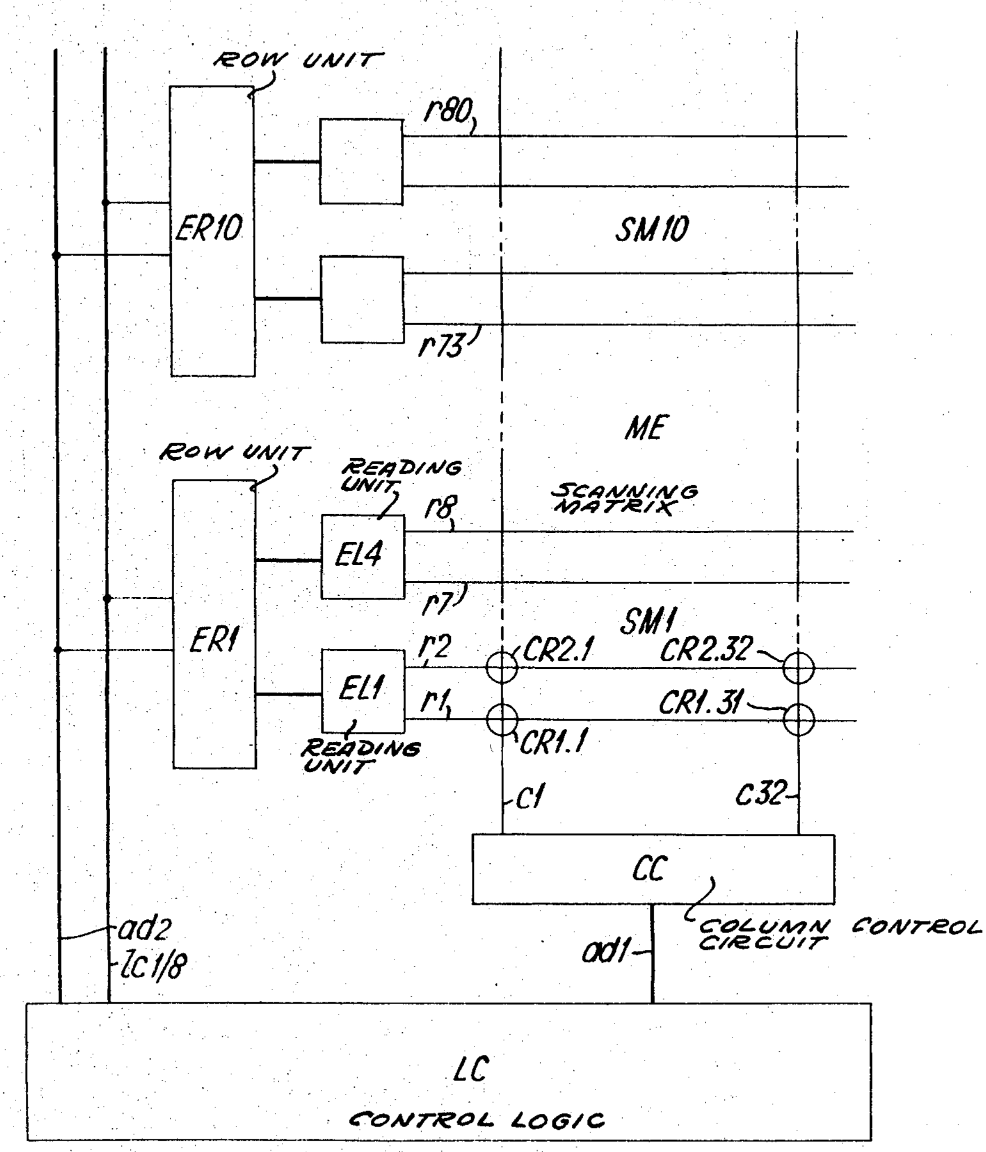
Figure 4:
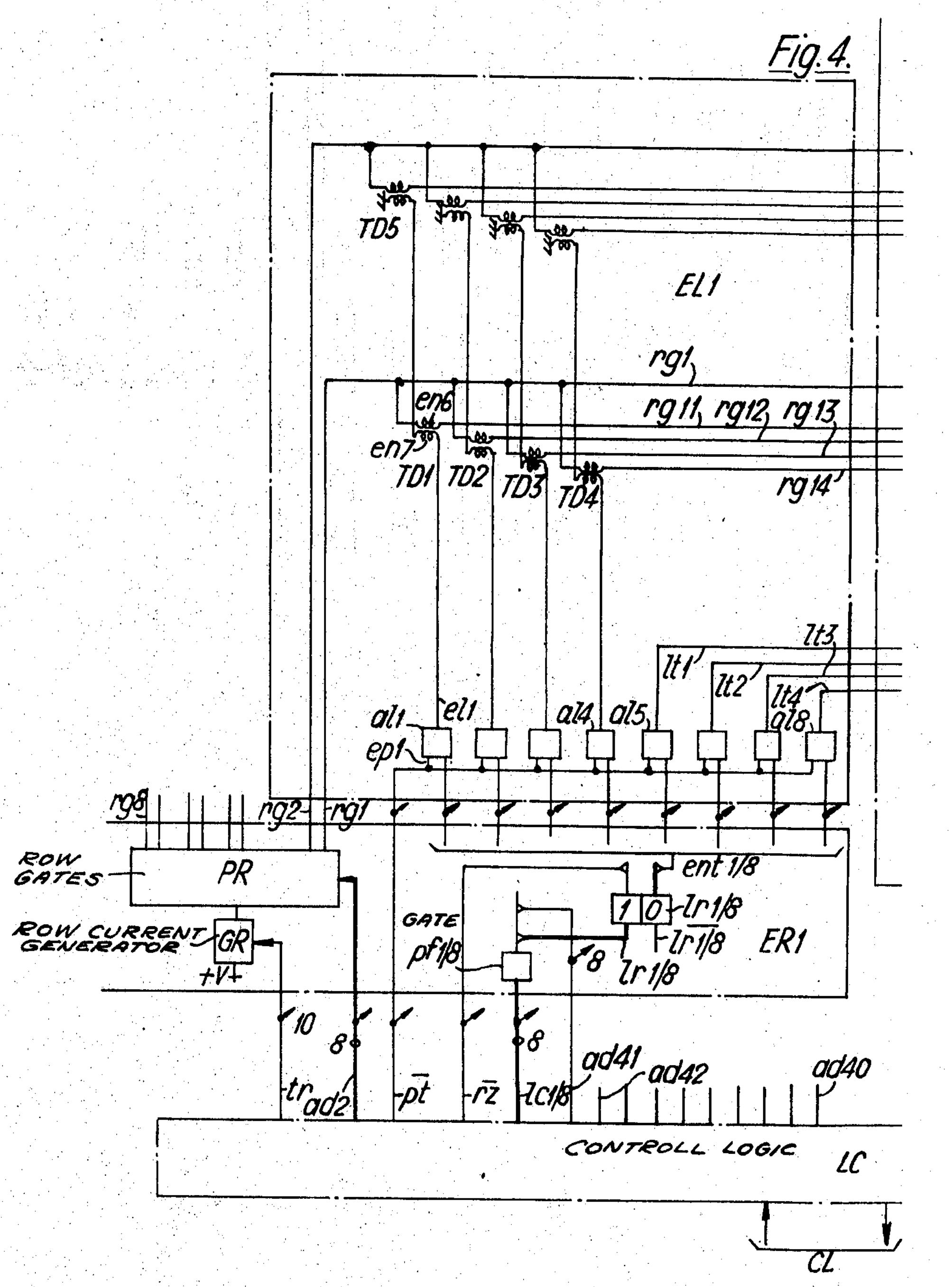
Figure 4A:
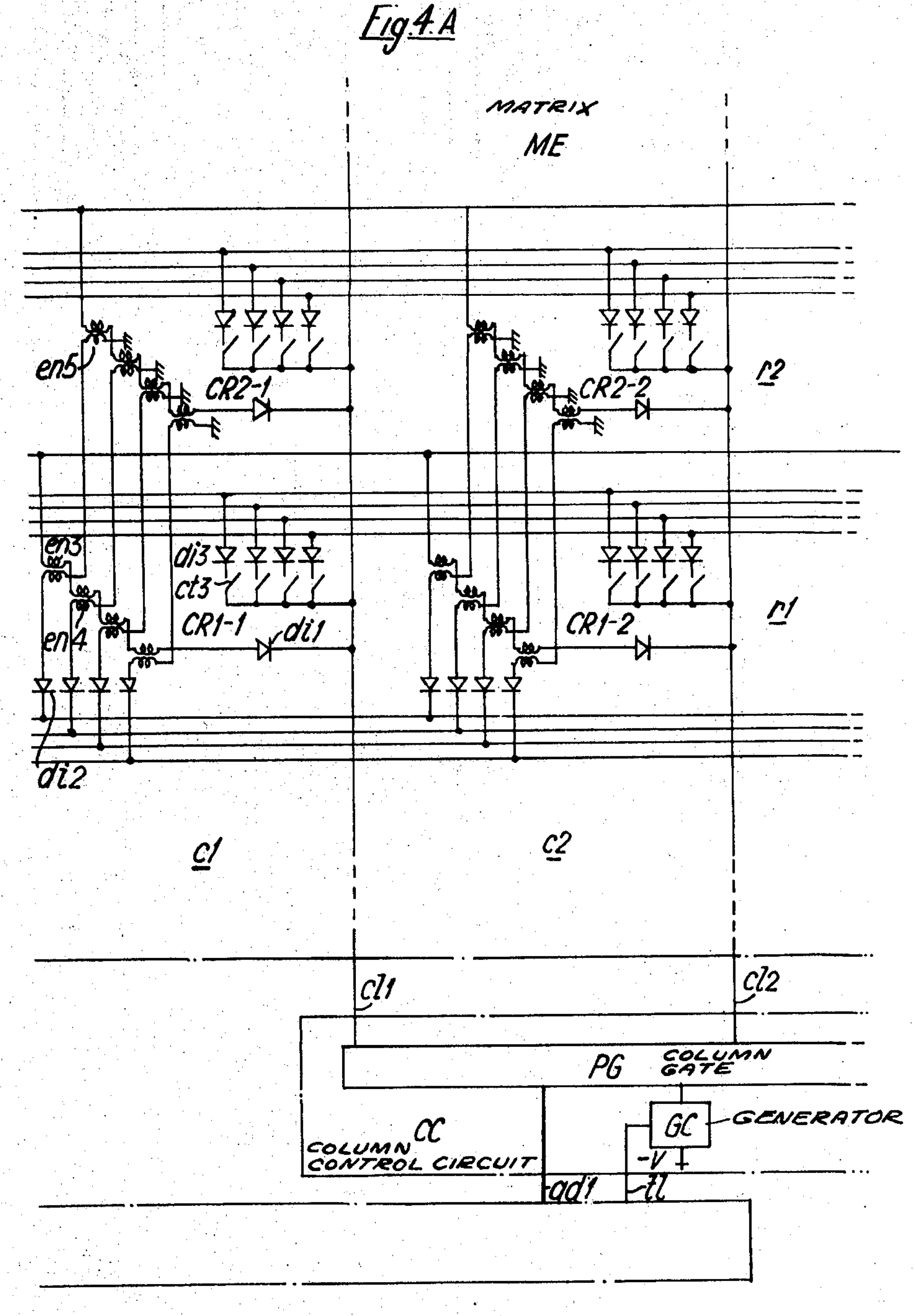
Figure 5:
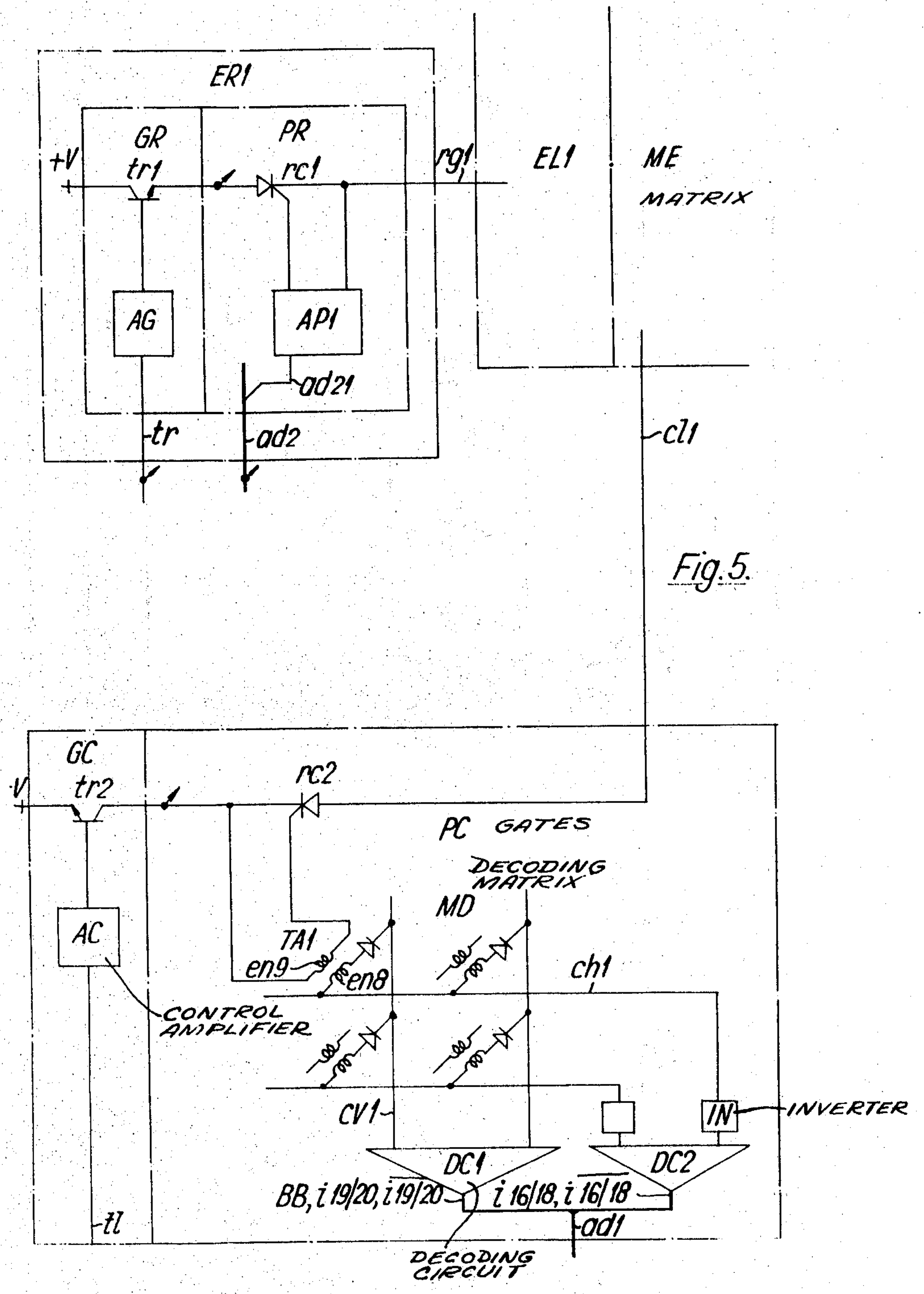

Different other features of the invention will become apparent from the description that follows, given by way of non-limiting example, in conjunction with the accompanying drawings comprising:

FIG. 1, a simplified block diagram of a telephone exchange in which the electronic scanner of the present invention can be used;

FIG. 2, an embodiment of a subscriber individual unit;

FIG. 3, a general diagram of an embodiment of the electronic scanner, object of the present invention;

FIGS. 4 and 4A, the block diagram of the electronic scanner of the present invention;

FIG. 5, the control circuits of the rows and columns of the scanner in FIGS. 3 and 4;

FIGS. 6 and 6A, the circuits of the control logic used in the scanner of FIGS. 3 and 4;

FIG. 7, a diagram indicating the spacing out of the time base signals used in the control logic of FIG. 5.

First will be described, in referring to FIG. 1, the diagram of a telephone exchange in which is used the scanner, object of the invention.

In this exchange, the subscribers lines such as 1*g* each have an individual line unit such as JA and are connected to the outlets of a connection network RC. This connection network RC, made up of several stages of crossbar switches, makes it possible namely to connect the lines to common units, for instance local junctors, such as junctor JC. The junctor JC has an access 1*a* for the connection of a calling line, and an access 1*e*, for the connection of a called line. It enables establishing a call between these two lines and it is responsible for providing to these two lines the various signals and currents necessary for this purpose.

Establishing the calls is controlled by the computer CL which, namely, takes note of the condition of the subscribers' lines by interrogating the individual units, through the scanner EXA and which gives the appropriate orders to the connection network RC.

Two conditions are essentially distinguished in which an inactive subscriber's line is current-supplied by its individual unit: *a*) when it is free, that is to say "not looped," and *b*) when after a call —obtained or not obtained —the connection established by the connection network RC is released, whilst the subscriber has not yet replaced his handset, the line being therefore "looped," while the computer CL considers it still as being busy. In the first case, as long as the line remains "not looped" there is no operation to be effected as concerns it. Whereas, if the subscriber lifts his handset, a loop appears and the computer CL must intervene in order to connect the line to a junctor or to any other common unit. In the second case, as long as the line remains looped, there is no operation to be effected as concerns it. For the computer CL, the said line stays busy. Whereas, if the loop is removed, the computer CL must be informed of it, so as to be aware that the line is now free again.

The number of lines is very large and, in order to limit the interchanging of information between the individual units of the lines and the computer, it is advisable that instead of signalling to the computer the conditions of all the lines, to signal only the lines which have just changed condition. To obtain this, one can readily see that the immediate observation of the condition of a line is not enough and that it is necessary to compare its present condition to a stored information, indicating whether the line was initially in condition *a*) or in condition *b*) defined previously, that is to say to its former condition.

In the patent application mentioned in the preamble of the present specification, a subscriber's line individual unit is described capable of maintaining an information on the initial condition of the line. A simplified diagram of this line individual unit is given in FIG. 2. It comprises mainly a saturable transformer TFA with four windings, *en*1 to *en*4, and three contacts, *ct*1 to *ct*3. There is not shown in this figure the means of control of these contacts.

When the line 1*g* is in one of the two listed conditions *a*) or *b*) and has to be current-supplied by its individual unit, the contacts *ct*1 and *ct*2 are closed. The line is then current-supplied by: earth potential, battery *bt*, contact *ct*1, winding *en*1 of transformer TFA, wire *b*, line 1*g*, wire *a*, winding *en*2 of TFA, contact *ct*2, earth potential. If the line is not looped, no current flows. The transformer TFA is not saturated. A current transmitted to the interrogation winding *en*3 by the scanner EXA creates a voltage at the terminals of the reading winding *en*4. The detection of this reading voltage indicates that the line is not looped. If, on the contrary, the line is looped, a current flows and the fluxes of same direction produced by the windings *en*1 and *en*2 saturate the transformer TFA. A current transmitted by the interrogation winding *en*3 remains then practically without any effect on the reading winding *en*4. Absence of induced voltage indicates that the line is looped.

In order to maintain and signal the initial condition of the line, the display contact *ct*3 is used. In the foregoing condition *a*) the contact *ct*3 is open. In condition *b*), it is closed. It is just necessary that the scanner EXA ascertains what is the position of this contact so as to be able to interpret correctly the information provided by interrogation of the transformer TFA.

The present invention concerns a scanner capable of detecting at the same time, the conditions of the saturable transformer and of the display contact in numerous individual units of the same type as the one in FIG. 2. An embodiment will now be described by referring to FIGS. 3 and 4.

FIGS. 3 and 4 show the essential elements of the scanner EXA of FIG. 1. This scanner comprises a control logic LC that exchanges information with the computer, a scanning matrix ME in which are connected the interrogation and reading windings and the display contact of the individual units, a column control circuit CC, several row units such as ER1, and several readings units such as EL1.

The diagram of the links in FIG. 3 represents symbolically the fashion according to which these various units are interconnected, in the case of a scanner having a capacity of 10—240 individual units.

The scanning matrix ME has 32 columns, *c*1 to *c*32, and 80 rows, *r*1 to *r*80, which defines 2560 crosspoints such as CR1–1 to CR1–1, CR2–1 to CR2–32, etc. To each crosspoint are connected 4 individual units, so that the matrix ME houses the 10—240 individual units provided.

The rows are distributed into groups of 8. There is partly shown in the FIG. only the first group comprising the rows *r*1 to *r*8, and the last group, comprising the rows *r*73 to *r*80. This defines 10 submatrices, SM1 to SM10 having common columns.

Moreover, the rows are grouped into pairs.

A reading unit is associated with each pair of rows. Thus, the reading unit EL1 is associated with rows *r*1 and *r*2, the reading unit EL4 with rows *r*7 and *r*8, etc. When a crosspoint of a row is selected, the associated reading unit receives and amplifies the reading signals. Two rows have been connected to the same reading unit for economy purposes; this number may vary according to the electrical characteristics of the circuits and of the reading signals provided by the individual units.

One row unit is associated with each group of rows, that is to say with each submatrix. The row unit ER1 is thus associated with rows *r*1 to *r*8 of the submatrix SM1, same as the row unit ER10 is associated with the submatrix SM10. The row unit has as its function the selection of a row, then to gather and to store the reading results issued from this row.

The column control circuit CC is single for the 32 columns, and the whole arrangement is handled by means of the control logic LC.

The operation of the scanner is effected in two periods of time. During the first period, the control logic LC provides the address of a column, through the conductors *ad*1, to the column control circuit CC, and the address of one row out of 8, through the conductors *ad*2, to the 10 row units ER1 to ER10 simultaneously.

The column control circuit CC selects one column, *c*1 for instance.

Each row unit selects a row of the associated submatrix. The row unit ER1 selects, for instance, the row *r*1 of the submatrix SM1, and, the unit ER10 the row *r*73 of SM10.

Ten crosspoints are thus selected simultaneously in the matrix ME, one in each submatrix, such as the crosspoint CR1–1 of SM1. This will enable ascertaining the condition of 40 individual units.

The results of the reading of each of the selected crosspoints appear in the corresponding reading unit. The unit EL1 thus receives the results of the reading of crosspoint CR1–1. The reading result received by a reading unit is immediately transmitted to the row unit of which it depends, so as to be stored therein. Hence, the reading result received by EL1 is immediately stored into the row unit ER1. The same operation is simultaneously effected for the other submatrices and associated row units.

At the end of the first period, the 10 row units therefore contain each the results of the reading of a crosspoint, that is to say of 4 individual units.

During a second period, the control logic LC interrogates in succession the 10 row units and receives, through the conductors $\overline{lc1/8}$, the results of the reading of the 10 selected crosspoints. These reading results are analyzed, in the control logic LC, for the detection of changes of condition of the individual units.

Now, by referring back to FIG. 4, will be explained in detail the scanning circuits—with exclusion of control logic LC which will be described subsequently by referring to FIG. 6. For the sake of simplicity, there is shown in FIG. 4 only certain elements of FIG. 3 necessary for the description of the circuits. These elements conserve the references they had in FIG. 3.

To each column of the matrix ME there corresponds a column conductor originating from the column control circuit CC. There are represented, in the FIG., only the two column conductors *cl*1 and *cl*2 of columns *c*1 and *c*2. The circuit CC makes it possible to connect, selectively, one of these column conductors to a potential source —V, through the column gates PC, as per an address element *ad*1 provided by the logic LC, and through the column current generator GC set into operation by an order transmitted along wire *t*1.

To each row there corresponds a row principal-conductor and four auxiliary conductors, originating from a reading unit such as EL1. Only two rows *r*1 and *r*2 have been represented, and for instance to the first row there correspond the principal conductor *rg*1 and the auxiliary conductors *rg*11, *rg*12, *rg*13, *rg*14. It is seen that in the reading unit EL1, the auxiliary conductors are connected to the row principal conductors through the primary windings of the detection transformers TD1 to TD4. The auxiliary conductor *rg*11 is, for instance, connected to the conductor *rg*1, through the primary winding *en*6 of transformer TD1. A row unit such as ER1 makes it possible to connect, selectively, the conductors of a row to a +V potential source through row gates PR, as per an address element *ad*2 provided by the logic LC and through a row current generator GR set into operation by an order transmitted along the wire *tr*.

Moreover, in the matrix ME, for two rows, there has been provided a group of four reading conductors. Thus it is that reading conductors *lt*1 to *lt*4 are associated with the two rows *r*1 and *r*2, represented in part.

At crosspoint CR1–1 there is found, between the row principal conductor *rg*1 and the column conductor *cl*1, a circuit which comprises: the interrogation winding *en*3 of the saturable transformer TFA, belonging to the subscriber individual unit JA (FIGS. 1 and 2), the interrogation windings of three other individual units identical to JA and a decoupling diode *di*1. The corresponding reading windings, among which the winding *en*4 of JA, are respectively connected to the reading conductors *lt*1 to *lt*4, through decoupling diodes such as *di*2. It is worth noting that the reading windings of the crosspoint CR2–1 are connected in series with those of crosspoint CR1–1, which simplifies the wiring.

Still at crosspoint CR1–1, there is found, between the four row auxiliary conductors *rg*11 to *rg*14 and the column conductor *cl*1, the four display contacts of the four individual units assigned to this crosspoint, and, in particular, the contact *ct*3 of the unit JA (FIGS. 1 and 2).

The other crosspoints of the matrix are identical to CR1–1.

The reading circuits common to the two rows, *r*1 and *r*2, are grouped in the reading unit EL1. The unit EL1 contains eight reading amplifiers, *al*1 to *al*8, and the eight already mentioned detection transformers of the two rows. There are as many similar reading units as there are pairs of rows in the matrix ME. They are identical to EL1.

To the reading inlet of each of the four first reading amplifiers, *al*1 to *al*4, are connected, in series, the secondary windings of a detection transformer of each of the two rows. The secondary windings of the transformers TD1 and TD5 are thus connected to the inlet *el*1 of the reading amplifier *al*1, which happens to be coupled, therefore, to the first auxiliary conductor of each row. If it is assumed, for instance, that the contact *ct*3 is closed, that the conductor *rg*1 is connected to the +V potential and that the conductor *cl*1 is connected to the −V potential, a current flows through: conductor *rg*1, primary winding *en*6 of transformer TD1, auxiliary conductor *rg*11, a decoupling diode *di*3, contact *ct*3 and the conductor *cl*1. This current induces a voltage to the terminals of the secondary winding *en*7 of transformer TD1, which is transmitted to the amplifier *al*1. If the contact *ct*3 is open, no voltage is provided by *en*7.

The four reading conductors *lt*1 to *lt*4 common to both rows are connected to the reading inlets of the reading amplifiers *al*5 to *al*8. If the foregoing example is being considered once more (conductor *rg*1 at +V and conductor *cl*1 at −V), it is seen that the four interrogation windings of the crosspoint CR1–1 have a current flowing through them. Among them there is found the winding *em*3 of the individual unit JA (FIGS. 1 and 2). If moreover it is assumed that the corresponding subscriber line is not looped and that its transformer is not saturated, an induced voltage appears in response at the terminals of the reading winding *en*4. This voltage is transmitted to the reading amplifier *al*5, through the decoupling diode *di*2 and the reading wire *lt*1. If the line is looped, the saturable transformer is saturated and the winding *en*4 does not provide any voltage.

Consequently, it is clearly seen that, when the crosspoint CR1–1 is selected, the amplifiers *al*1 and *al*5 receive signals indicating the former condition (*al*1) and the present condition (*al*5) of line *lg*, provided by the interrogation of its individual unit JA FIGS. 1 and 2). The eight reading amplifiers receive the signals which give the condition of the four individual units assigned to the crosspoint CR1–1. They would receive, in the same fashion, the condition of the individual units of any one of the crosspoints belonging to the two rows with which they are associated.

A reading amplifier such as *al*1 has: a reading inlet *el*1 controlled as was described above, a strobing input *ep*1 connected to the conductor $\overline{pt}$ originating from the logic LC, and an outlet $\overline{al}1$. The conductor $\overline{pt}$ is normally positive. In such conditions, the amplifier *al*1 is blocked and its outlet $\overline{al}1$ provides a positive voltage, through a high impedance. When the conductor $\overline{pt}$ is connected to earth potential, in the logic LC, the amplifier *al*1 is rendered conducting and, if it receives a signal on its reading inlet *el*1, its outlet $\overline{al}1$ is brought to the earth potential through a low impedance. If it does not receive any signal on its inlet *el*1, its outlet $\overline{al}1$ remains positive. The other reading amplifiers are identical.

The row unit ER1 controls eight row conductors, *rg*1 to *rg*8. It enables connecting selectively one of them to the +V potential source, when one of the gates PR is open and when the current generator GR is rendered conducting. Four reading units such as EL1 are associated with the unit ER1. Their outlets are connected in parallel to the row unit ER1.

More accurately speaking, the eight amplifiers of the reading units are connected, in parallel, to the inlets of eight bistables *lr*1 to *lr*8 (*lr*1/8 in abridged form) which constitute a register enabling the storing of the reading results, until the logic LC might process them. It is worth noting that the four reading amplifiers are connected in parallel to the inlet of the same bistable. In rest condition, they all provide a positive potential. When a reading operation is effected, one of them possibly transmits the earth potential. This earth potential, provided under a low impedance, short-circuits the positive outlets of the three other amplifiers and controls the input of the bistable. The inactive amplifiers do not hinder the operation.

The bistables such as *lr*1/8 have two input conductors placed at the upper part and to each of which is connected an inlet, through the medium of a small triangle. In rest condition, the inlets of the bistables must receive positive signals. This is the case for the bistables *lr*1/8, the logic LC providing an outgoing positive signal along the wire $\vec{rz}$, whereas the outlets of the reading amplifiers are positive, as was just mentioned above. The two outlets of the bistables are placed at the lower part. When a bistable is in position O, it provides a positive signal to the corresponding outlet ($\overline{lr1/8}$) and a null signal to the other outlet ($\overline{lr1/8}$). To make it pass onto position 1, it is just necessary to provide a null signal to it (say an earth potential) on the inlet, side 0 (*ent*1/8). The outgoing signals are then permuted. To make it restore to position 0, it is just necessary to provide a null signal to it on the inlet, side 1.

The common logic, through the wire $\vec{rz}$, thus sets the bistables *lr*1/8 into position 0, before any reading. Then it controls the strobing. Since the unit ER1 selects only one row, for instance *r*1, only a reading unit is liable to provide information which is stored by the bistables. Subsequently, the common logic will take note of this information, through the gates *pf*1/8.

A gate such as *pf*1/8 is a gate of the "NAND" type. It is represented in the FIG. by a square having at its upper part an input conductor to which are connected one or several inlets, through the medium of small triangles. These inlets are decoupled between them (the triangles represent decoupling diodes), unlike the multipled inlets, of course. The output is placed at the lower part. The gate provides a null signal when all the inlets are positive. If at least one of the inlets is not positive, it provides a positive signal. Consequently, when the logic LC provides a positive signal along the conductor *at*41, proper to the unit ER1, onto the eight gates *pf*1/8, any gate which already receives a positive signal from the corresponding bistable will provide a null signal. The others continue to provide a positive signal. Along the conductors $\overline{lc1/8}$ appear therefore signals which define the condition of the bistables *lr*1/8, representing therefore the read information.

After having described the composition of the scanner of FIG. 4 an example will now be described of the operation of the whole, in assuming that the control logic LC has received the order to identify the condition in which are the four individual units of the crosspoint CR1–1 of matrix ME.

In a first period, the logic LC provides an address element *ad*1 transmitted, in the column circuit CC, to the column gates PC. One of these gates opens and connects the column conductor *cl*1 to the generator GC.

In a second period, the logic LC provides a signal along the wire *tl* so as to control the starting into operation of the column current generator GC. The column conductor *cl*1 is then connected to the −V potential source.

In a third period, the logic LC provides an address element *ad*2, transmitted simultaneously to all the row units. In the unit ER1, namely, this address element is communicated to the row gates PR. One of these gates opens and connects the row conductor *rg*1 to the row current generator GR. Same applies in each row unit.

In a fourth period, the logic LC provides a signal along the wire *tr*, in order to control, in each of the row units, the starting into operation of the row current generator. In the unit ER1, namely, the generator GR is thus set into operation and provides a +V potential along conductor *rg*1.

At this instant, as concerns the row selected by the unit ER1, a current is established by the following circuit: +V potential source, generator GR, selected gate PR, conductor *rg*1, winding *en*3 and next ones of the crosspoint CR1–1, diode *di*1, conductor *cl*1, selected gate PC, generator GC, −V potential source. Moreover, if it is assumed that the contact *ct*3 of crosspoint CR1–1 is closed, a current flows at the same time through: +V potential source, ... conductor *rg*1, winding *en*6, conductor *rg*11, diode *di*3, contact *ct*3, conductor *cl*1, ... −V potential source. Analogous circuits can be established by the three other contacts of the crosspoint CR1–1.

Considering the dimensions of the scanner and the length of the wiring of matrix ME, the establishment of these currents requires a certain time, say of about 10 microseconds. During this delay, the logic LC provides a null voltage impulse along the conductor $\overline{rz}$. The storing bistables are set into position O, in all the row units. The bistables *lr*1/8 of ER1 are thus prepared for the reading.

When this delay expires, the currents are established in the matrix. In taking once more the above described example about the unit JA (FIGS. 1 and 2) comprising the windings *en*3 and *en*4, as well as contact *ct*3, it can be assumed that the current established in the interrogation winding *en*3 causes a voltage to originate at the terminals of the reading winding *en*4. This voltage is transmitted, through the diode *di*2 and the reading conductor *lt*1, to the reading amplifier *al*5. Simultaneously, the contact *ct*3 being supposed closed, the current established in the winding *en*6 of the detection transformer TD1 produces a voltage at the terminals of the winding *en*7, transmitted to the reading amplifier *al*1. The other reading amplifiers receive at the same instant voltages characterizing the condition of the three other individual units of the crosspoint CR1–1. Same applies in the other row units which read each the condition of four individuals units.

The logic LC provides then, in a fifth period which terminates the reading properly speaking, a strobe impulse of null voltage along the conductor $\overline{pt}$. This impulse is transmitted to all the reading amplifiers of the scanner and causes the transfer of the reading signals to the registers of the row units. The reading amplifier *al*1, for example, which receives a voltage from the winding *en*6, provides in response a null voltage impulse to the right inlet of the bistable *lr*1 which thus passes into position 1. Same applies for the reading circuit *al*5 which makes the bistable *lr*5 pass into position 1 and for any reading circuit of EL1 having received a reading voltage. Since ER1 selects only one row, which depends of EL1, the other reading units, not represented in the FIG., connected to ER1, cannot provide any signal onto bistables *lr*1/8. Their outlets remain positive, and are without any effect on the bistables, as was already mentioned above.

Then, in a next period of time, the gates and generators are again blocked. Still because of the dimensions of the scanner, the logic LC must measure a certain delay during which any further reading operation is prevented. This delay corresponds to the time which is necessary for the wiring of the matrix to restore to its initial condition, after the charges accumulated during the reading operation have been eliminated. In this way, the delay is put to use by the control logic LC for processing the read information.

It will be supposed that logic LC has to take note of the condition of the four individual units of crosspoint CR1–1. For this purpose, when the reading operations are terminated, the logic LC transmits a positive signal along the conductor *ad*41, to the unit ER1. There is provided one analogous conductor (*ad*42,...*ad*40) to each of the other row units. This positive signal controls eight reading gates *pf*1/8 submitted, on the other inlet, to the condition of the bistables *lr*1/8. Any gate which corresponds to a bistable in position 1 already receives from this latter, on its other inlet, a positive signal. It operates therefore and provides a null voltage signal on its outlet, indicating that the bistable was in position 1. The eight outgoing conductors of the gates, $\overline{lc1/8}$. will thus receive the stored information. The control logic LC reads it and processes it in appropriate fashion, as will be seen subsequently.

The logic LC can thus take note, in succession, of all the read information and process it, for the detection of the changes of condition, for instance.

Now will be described, in referring to FIG. 5, an embodiment of the current generators and of the gates used in the scanner of FIG. 4.

By way of example, FIG. 5 represents the circuits used for the selection of the crosspoint CR1–1 of FIG. 4, that is to say the circuits controlling the conductors *cl*1 and *rg*1.

Therefore, in FIG. 5 are seen once more: the generator GC, one of the gates PC, the column conductor *cl*1 ending to matrix ME, the generator GR, one of the gates PR of the row unit ER1 and the conductor *rg*1 ending to the reading unit EL1.

The generator GC is essentially made up of an NPN power transistor *tr*2 and its control amplifier AC. In the description relating to FIG. 3, it was seen that when the generator GC must start into operation, the logic LC provides a positive signal along the wire *tl*. This signal renders conducting the amplifier AC which provides a current of appropriate intensity to the base of the transistor *tr*2. This latter becomes conducting and provides, through its collector, the necessary column current.

The gates PC are realized by means of controlled rectifiers, such as *rc*2, the cathode of which is connected to the generator GC. It is necessary to render conducting one column controlled rectifier, as per an address element *ad*1 provided by the control logic LC (FIG. 4). This address element comprises two parts: the first part is transmitted to a decoding circuit DC1 which provides in exchange an earth potential onto one of the vertical conductors of a decoding matrix MD: the second part is transmitted to a decoding circuit DC2 which provides in exchange an earth potential onto one of these outlets, which is converted by one of the inverters such as IN into a positive potential transmitted along one of the horizontal conductors of the decoding matrix MD.

Hence, as soon as the logic LC (FIG. 4) provides an address element *ad*1, corresponding for instance to the column *cl*1, a current flows through: positive potential provided by the inverter IN receiving an earth potential from the decoder DC2, horizontal conductor *ch*1, winding *en*8 of decoding transformer TA1, decoupling diode, vertical conductor *cv*1, earth potential in the decoder DC1. This current induces a current into the secondary winding *en*9 of transformer TA1, of direction such that the controlled rectifier *rc*2 should be rendered conducting.

The two decoders DC1 and DC2 are simple combinations of gates of the type already described, conditioned by the positive signals of the address *ad*1. There exists, for instance, one coincidence gate per outlet of the decoder. It normally provides a positive potential. When the address is received, only one gate operates and provides the earth potential.

It may be considered that the inverters such as IN are one inlet gates. When this inlet is positive, the inverter provides the earth potential; when it is earthed, the inverter provides a positive potential.

The generator GR is analogous to the generator GC and comprises an NPN power transistor *tr*1 and a control amplifier AG. When the logic LC (FIG. 4) provides a positive signal along the wire *tr*, the amplifier AG operates and provides a current to the base of *tr*.

The gates PR, same as the gates PC, are comprised of controlled rectifiers such as *rc*1, at the rate of one controlled rectifier per row depending upon the row unit ER1. The address element *ad*2 transmitted by the logic LC comprises one information per row, transmitted along a conductor particular to each row. There is therefore no decoding to do in the row units, the transmitted information being able to serve directly for rendering conducting the corresponding row rectifier. For the rectifier *rc*1, the control is transmitted along a conductor *ad*21. It influences a control amplifier AP1 which establishes in response a current between the control electrode and the cathode of the rectifier *rc*1 and renders this latter conducting.

The logic LC having provided in succession: an address element *ad*1 rendering conducting the rectifier *rc*2, an order along the wire *tl* rendering conducting the transistor *tr*2, an address element *ad*2 rendering conducting the rectifier *rc*1 and an order along the wire *tr* rendering conducting the transistor *tr*1, a current can be established between the column and the selected row. This current holds, even when the control current ceases to be provided to the control electrode of the rectifiers. It is interrupted when the logic LC removes the positive signals from the wires *tl* and *tr*, which causes the blocking of the transistors *tr*2 and *tr*1.

Now will be described, in referring to FIG. 6, an embodiment of the control logic LC of FIGS. 3 and 4. The various circuits of this device are realized by means of bistables and "-NAND" gates identical to those of FIG. 4.

The control logic LC receives the scanning orders from the computer CL (FIG. 1), executes these orders and transmits the obtained results to the computer. Any operation of the scanner, and therefore of the control logic LC, starts with the incoming of an order from the computer CL. This order comprises two "words" which are written in succession into the registers RG2 and RG1.

It will be assumed that initially all the bistables of the device are in position 0, with the exception of bistable B which is in position 1 to indicate that the scanner is not in operation. A clock HG is in permanent operation. It provides in succession and cyclically the time base impulses *ha*, *hb*, *hc*, *hd*, such as the diagram represents them in FIG. 7. The duration of the cycle, that is to say the time interval separating the beginning of two consecutive impulses *ha*, can be of one microsecond.

The control logic LC receives information from the computer CL through the links represented at the top of FIG. 6. It transmits information to the computer CL through the links represented at the foot and on the right of the FIG.

The bistable B being in position 1, its outlet B provides a positive potential, whereas its outlet $\overline{B}$ provides the earth potential. Its outlet B controls a gate *pt*1 which in its turn controls the wire $\overline{di}$ leading to the computer CL. The wire $\overline{di}$ is thus earthed, and this informs the computer that the scanner is not in operation.

The computer transmits a first "word" to the scanner by displaying this word along the conductors *is*0/15, a positive voltage corresponding to the bit 1, whereas the bit 0 is represented by a null potential. Moreover, during the period of display of this word, the computer CL provides a short positive signal along the conductor *vr*1, then a short positive signal along the conductor *vi*1.

The register RG2 is the address register. It comprises three sections, of four bistables each. It thus has twelve bistables, *i*16 to *i*27 and can receive twelve bits. Each of the three sections comprises a resetting inlet connected to the outlet of gate *pt*2. The restoring to zero takes place when the computer CL provides a positive signal along the wire *vr*1, the gate *pt*2 providing in exchange an earth potential towards the three sections of the register RG2.

The positive signal transmitted by the computer CL along the wire *vi*1 will then control the storing of the word displayed along the wires *is*0/15. This signal is transmitted to an inlet of 16 gates bearing the collective reference *pt*3. These gates have two inlets and the wires *is*0/15 are connected respectively to the second inlet. Consequently, the gates corresponding to positive wires *is*0/15 operate and provide an earth potential towards the register RG2. Out of the 16 outgoing wires of the gates *pt*3, twelve control individually the setting of the bistables of register RG2. The other four are not wired, because the corresponding bits are not used inside the scope of the present invention. At the end of the sending of signal *vi*1 by the computer, the word displayed on wires *is*0/15 is therefore written in the register RG2.

The computer CL an instant later, displays a second word on the wires *is*0/15 and provides, during the period of display of this word, successive positive signals along the wires *vr*0, *vi*0 and *vt*.

The register RG1 comprises two sections, the first one (four bistables, *i*0 to *i*3) is used as order register, the second one (eight bistables, *i*4 to *i*11) is used as analysis register. The first section is directly reset by the signal *vr*0 inversed by the gate *pt*4. For the restoring to zero of the second section, it is necessary first to consider that the input conditions of the gate *pt*5 are not met and that, consequently, this gate provides a positive potential to the upper inlet of gate *pt*7. As the signal *vr*0 is initially absent, the gate *pt*6 also provides a positive potential to upper inlet of gate *pt*7. Hence, this latter provides an earth potential and the gate *pt*8 which follows it provides a positive potential towards the second section of register RG1. When the signal *vr*0 originates, the gate *pt*6 provides the earth potential; the gate *pt*7 subsequently provides a positive potential and the gate *pt*8 provides an earth potential which really controls the resetting of the second section of register RG1. This arrangement as will be seen subsequently, enables the resetting of this second section, by a control operation influencing the gate *pt*5.

The positive signal transmitted then by the computer CL along wire *vi*0, controls the storing of the word displayed along wires *is*0/15. This signal is transmitted to an inlet of 16 gates bearing the collective reference *pt*9. These gates are moreover conditioned by the condition of wires *is*0/15, and those which operate will provide an earth potential to the register RG1. Upon the 16 outgoing wires of these gates, four control individually the setting of the bistables of the first section of register RG1. The others are not utilized inside the scope of the present invention.

Consequently at the end of the sending signal *vi*0, by the computer CL, the word displayed along the wires *is*0/15 is stored into the register RG1.

Moreover, immediately after having controlled the storing into register RG1, the computer CL sends a start-into-operation order, in the form of a positive signal transmitted along the wire *vt*. This signal, inversed by the gate *pt*10, controls the resetting of the bistable B. Along the wire *di*, the earth potential is replaced by a positive signal in order to mark that the scanner is in course of operation.

The first information transmitted by the computer CL and stored into the register RG2 is the start address of the scanning operation. The first five bits, stored in the bistables *i*16 to *i*20 define the number of the column to be selected in the matrix ME (FIGS. 3 and 4). The next three bits, stored in the bistables *i*21 to *i*23 define the row number to be communicated to each row unit. The last four bits provide the row unit number. If it is referred back to the description relating to FIG. 3, it is easy to verify that these information items define a crosspoint, between a row depending of a given row unit and a column, that is to say a group of four individual units.

It can be pointed out right away that the scanning takes place normally, in the embodiment described here, by groups of 640 individual units corresponding to half a row: for reasons pertaining to the general operation of telephone installations and are out of the scope of the present invention. The identity of the group of 640 individual units is given by the bits which are received by the bistables *i*20 to *i*23. It is the computer which provides this information and the control logic LC cannot modify it. It includes the row number and one bit of the column number (heaviest weight). As will be seen subsequently, scanning of the 640 individual units will take place by stepping cyclically from 0000 to 1001 (10 combinations) the row unit number, provided by the bistables *i*27/24 mounted by way of a counter, and by making step forward from 0000 to 1111 (16 combinations) the column number fraction provided by the bistables *i*19/16, also mounted by way of a counter. The scanning bears upon four individual units at the same time, this makes it indeed possible to read the condition of 4× 10×16=640 individual units. These 640 individual units are positioned in 10 rows (one per submatrix) designated by *i*23/21 and half of the columns designated by *i*20.

The second information transmitted by the computer CL, and stored into the first section register RG1 is an order code defining the nature of the operation to be effected. Several distinct orders can thus be given by the computer. The case will be considered here wherein this order requires the scanning of the individual units starting from the provided address, with signaling of the individual units in which a change of condition has produced itself. This order is characterized by the fact that the bistable *i*3 is set into position 1.

Operation of the control logic LC is governed by a time allotter DT, this latter being in its turn controlled by a cycle counter CP and by the clock HG. The counter CP is initially in position 0. Its position is transmitted to the time allotter DT which receives moreover the time base impulses *ha, hb*, pg,20 *hc*. As long as the counter CP is in position 0, the time allotter provides, in exchange of the signals *ha, hb hc*, corresponding time signals $\overline{d0a}$, $\overline{d0b}$, $\overline{d0c}$. The signal $\overline{d0a}$is provided along a conductor bearing the same reference. This conductor is normally positive and it is set at a null potential during the impulse *ha*, on condition that the counter CP should be in position 0. The signal *d0a* is therefore an earth potential impulse practically coinciding with *ha* when CP is in position 0. The signals $\overline{d0b}$, $\overline{d0c}$ correspond to *hb* and *hc*, CP being also in position 0. Likewise, the time allotter provides, according to requirements, signals such as $\overline{d3a}$, $\overline{d4b}$, ... $\overline{d27a}$. The letter *d* indicates that this is the case of a time impulse, the digit or number next to it corresponds to the position of the counter CP and the end letter helps to mention again the time base impulse from which is originated the considered time signal. The time allotter DT is realized in a simple manner by means of gates of the type described above, controlled by the signals provided by the counter CP and the clock HG. When such a gate receives the provided combination of positive signals, its outlet, formerly positive, is connected to the earth potential. This is why the time signals are earth impulses and their reference symbols—in the FIG.—are surmounted by a small dash, which is the sign of the logic inversion.

Operation of the control logic LC can start from the instant where the order transmitted by the computer CL is stored into the register bistables RG1, the bistable *i*3 being in position 1. It starts when the time allotter DT provides the signal $\overline{d0b}$. The gate *pt*11 receives $\overline{d0b}$ in the form of an earth potential impulse. It provides in exchange a positive impulse. As the bistable BJ is in position 0, its outlet $\overline{BJ}$ provides a positive signal. The outlet *i*3 of bistable *i*3 is also positive. The gate *pt*12 therefore operates and provides an earth impulse which sets the bistable BK into position 1.

At the next instant *hc*, the gate *pt*32 operates (*hc* and BK positive) and provides an earth potential along the stepping control conductor *ah* of the counter CP. The counter CP steps by one step each time that an earth potential impulse is applied to the conductor *ah*, at the end of this impulse. As long as the bistable BK remains in position 1, it will step therefore step by step at the end of each time base impulse *hc* and will count cycles of one microsecond. The allotter DT will provide the time signals corresponding to the stepping of the counter and which will control the various operations to be accomplished.

The time signal $\overline{d1c}$ sets directly the bistable BB into position 1. This latter renders positive its outlet BB and thus completes the address element *ad*1 meant for the column control circuit CC. This address element comprises, along 10 conductors originating from the five first bistables of register RG2, the information giving the number of the column to be selected. The signal BB is transmitted along an eleventh conductor. It can be seen, by referring to FIG. 5, that the signals *i*16/18 and $\overline{i16/18}$ which correspond to the three first bits, control the decoder DC2. This decoder operates therefore as soon as the computer has stored the address into RG2. The BB signals *i*19/10 and $\overline{i19/20}$ control the decoder DC1. Consequently, the decoder DC1 only provides an earth potential to one of its outlets when the bistable BB provides the signal BB, that is to say starting from the originating of signal $\overline{d1c}$. At this instant, a column gate opens.

The signal $\overline{d3a}$ sets directly the bistable BC into position 1. This latter provides a positive signal along the wire *tl*, in direction of the amplifier AC of column current generator GC (FIG. 5). The selected column is thus connected to the −V potential source.

The signal $\overline{d4b}$ sets directly the bistable BD into position 1. This latter renders positive its outlet BD and thus completes the address element provided to the decoder DC3, analogous to the decoder DC1 of FIG. 5. This address element comprises, along six conductors originating from the bistables *i*21/23, the information indicating which row has to be selected by each of the row control units. In response, the decoder DC3 marks with an earth potential one of the eight conductors *ad*2 which transmit thus a decoded address element onto all the row units at the same time. By referring again to FIG. 5, it is worth recalling here that this address element makes it possible in each row unit to render conducting a row gate.

The signal $\overline{d5c}$, inverted twice and amplified by the inversions, is transmitted onto the row units along the wire $\overline{rz}$, in order to reset the bistables of the reading registers.

The signal $\overline{d7}$ *c sets directly the bistable BE in position 1. This latter provides a positive signal along the wire tr*, in the direction of all the row control units at the same time. By referring again to FIG. 5, it is seen that this control operation causes the setting into operation of the row current generator, in the row unit ER1 same as in each one of them.

At this instant, a current is established in the matrix ME (FIGS. 3 and 4) between the selected column and a row of each row unit such as ER1. The reading amplifiers receive—or do not receive—reading voltages.

At the time *hb* which follows the passing of BE to position 1, which would correspond to $\overline{d8b}$, the gate *pt*13 operates and provides an earth potential along the strobing wire $\overline{pl}$.

In referring again to FIG. 4, it is worth recalling here that this control operation causes the operating of the reading amplifiers and the transmission of the read information to the registering bistables in the row units.

The reading operation is terminated. The results are stored into the row units. The signal $\overline{d8c}$restores the bistables BB, BC, BD, BE to position 0. The various orders transmitted for the operation of the interrogating and reading circuits are canceled.

It was just seen above that the gates and current generators of the scanning matrix are set into operation in sequence, in a given order. This order, and the interval between the various operations can be freely obtained by the choosing of time signals which control the bistables BB to BE. In practice, they are determined by the needs for the checking of the operation of the scanner various circuits. In performing some checkings, after control of each of the operations, it is possible to detect any fault in the operation capable of distorting the results of the scanning, and to prevent any failure which might damage the equipment. And moreover, instead of interrupting the operation of all the circuits at the same instant, as was described above, it is possible to space the stop orders by resetting the bistables BB to BE, each one by means of an appropriate time signal. Finally, it is also possible to choose in the same way the durations of the various orders.

After having explained the reading operation, there will now be described how the reading results are put to use.

The signal $\overline{d11}$ esets directly the bistable BJ into position 1.

At the next time *ha* the gate *pt*5, which receives *ha*, $\overline{B}$ and BJ, operates, provides an earth potential to gate *pt*7, and the latter provides a positive signal to the gate *pt*8. This latter sends a resetting order onto the bistables *i*4/11 of the register RG1. These bistables are already in position 0, but the circuit just described above will serve to reset them systematically at each of the times *ha*.

At the time *hb*, the gate *pt*14 operates and provides an earth potential to the gate *pt*15, this latter provides a positive signal to the decoder DC4. This decoder receives on the other hand a third address element provided by the bistables *i*24/27 of register RG2. This address element is the number of the row unit to be interrogated. The decoder DC4 provides in response a null voltage signal upon one of its outlets; and, one of the gates *pt*16 transmits a positive signal along one of the ten conductors *ad*40/49, in the direction of one of the row units, say for instance along the conductor *ad*41 of unit ER1. As is indicated in the description relating to FIG. 4, this signal opens the reading gates of unit ER1 and causes the backwards transmission of the requested information, along the conductors *lc*1/8. It is seen, in FIG. 6, that the conductors *lc*1/8 are connected to the inlets of bistables *i*4/11 of the register RG1 second section.

As concerns the meaning of the received information it is worth recalling here that one nonlooped line, and that a closed display contact, would give place to the appearance of reading voltages energizing the reading amplifiers and setting into position 1 the storing bistables of the row units. The bistables in position 1 cause the operation of the reading gates and the transmission of a null voltage signal along the corresponding conductor among $\overline{lc1/8}$. These signals set into position 1 the bistables *i*4/11. The bistables *i*4 and *i*8 thus receive, for instance, the information displayed by the bistables *lr*1, *lr*5 of FIG. 4, when reading is made of the condition of individual unit JA of the FIGS. 1 and 2.

It is worth remembering also that a free line has its display contact open, and, is normally nonlooped. A looped line having its contact open has, therefore, just changed condition. In this case, the information received is 00. Likewise, a nonfree line is normally looped. If it is found to be nonlooped, we may conclude that it has just changed condition. The received information is then 11.

It is easy to detect the changes of condition by comparing, two by two, the conditions of the bistables *i*4/7 and *i*8/11. If the conditions of two associated bistables are identical, the corresponding individual unit will have just changed condition. This is effected simply by means of an arrangement of eight gates, such as *pt*17, controlling the gates *pt*18 and *pt*19. If the bistables *i*7 and *i*11 are neither both in the position 1, nor both in the position 0 (next gate), none of the two left gates operates. Both provide a positive signal onto the lower inlet of the gate *pt*18. Same applies to each of the four pair of gates. In this case, the gate *pt*18 which receives only positive potentials operates and provides an earth potential to the gate *pt*19, this latter provides a positive signal to the conductor $\overline{X}$. Whereas, if the two bistables *i*7 and *i*11 are in the same position, for instance 1, the gate *pt*17 provides an earth potential which short circuits the outlet of the associated gate and prevents the operation of the gate *pt*18. In this case, the outlet $\overline{X}$ is connected to earth.

Consequently, in order to summarize at the time *ha* the bistables *i*4/11 receive a resetting order. At the time *hb* they receive the reading results from a group of four individual units. These results are analyzed right away, and, if there is no change of position, the conductor $\overline{X}$ is positive; if a change of position is ascertained, the conductor $\overline{X}$ is earthed.

At time *hc*, the row unit stored in the bistables *i*27/24 is increased by one unit, with the aim of interrogating the next row unit. For that purpose, the bistables *i*27/24 are mounted by way of a counter, and the section *i*27/24 of register RG2 comprises a counting inlet controlled by the gate *pt*21. It is supposed that the gate *20 does not operate and provides a positive signal; the gate pt*21 which receives, on the other hand, *hc*, BJ and $\overline{X}$ operates and provides an earth potential onto counting inlet of section *i*27/24. The counter steps at the end of this impulse. The counter made up of section *i*27/24 has as many positions as there exist row units.

At the next time *ha*, the section *i*11/4 of register RG1 is reset, through gate *pt*5, as before.

At the next time *hb*, the information stored in the next row unit is written in the bistables *i*4/11 and is analyzed.

At the next time *hc*, if there is still no change of position, the counter *i*27/24 steps by one more step and provides the number of the next row unit.

The operation thus repeats itself, for each of the row units, starting from the unit initially designated by the computer, until the last one of them has been interrogated. If there are 10, the last one bears the number 9 in decimal numbering, that is 1001 in binary numbering.

At the end of the impulse *hc* preceding the processing of this last row unit, the bistables *i*24 and *i*27 of the counter happen therefore to be in position 1, and the bistables *i*25 and *i*26 in position 0. It is the last position of the counter.

The processing of the 9th row unit is effected normally. However, the gate *pt*20, which receives BK positive signals, *i*24 and *i*27, operates and provides an earth potential. So, at the time *hc* which terminates the processing of the 9th row unit, the gate *pt*21 cannot operate. This prevents the sending of a stepping impulse to the counter *i*27/24 and the restoring of the counter to position 0000.

Hence, at the next cycle (times *ha*, *hb*, *hc*) there simply is going to be processed, once more, the information which is provided by row unit number 9.

At the end of this operation, the counter will not step either, and processing of the row unit number 9 will be started once more. At each cycle of the clock, the logic will start again the processing of the same information provided by the last row unit. It will remain in that condition until the counter CP which continues stepping by one step at each cycle, reaches the position 27. In this way, the time assigned to one reading operation will always be constant, even if the computer orders to start the scanning with a row unit number 9, and this will enable complying with the times of operation of the scanner circuits and, namely, to save the necessary time for letting dissipate the charges accumulated by the extensive wiring of matrix ME (FIGS. 3 and 4).

When the counter CP reaches position 27, at the end of a time *hc*, the logic starts a last processing cycle (times *ha*, *hb*) of the row common unit number 9. This cycle is accomplished normally. However, at the time *ha*, the bistable BK is directly reset.

At the time *hb*, the counter CP is restored to zero by the gate *pt*22 receiving the conditions *hb* and $\overline{BK}$ and providing an earth potential along the resetting conductor *zh*.

At the next time *hc*, the gate *pt*21 operates and sends a stepping order onto the counter *i*27/24. Indeed, the condition BK being canceled, the outlet of gate *pt*20 is again positive. Hence, the counter *i*27/24 leaves its last position and restors to 0000 at the end of time *hc*.

Simultaneously, the fraction of the column number, stored by the bistables *i*19/*i*16, is increased by a unit. Indeed, section *i*19/16 of RG2 also constitutes a counter and comprises a stepping inlet controlled by the gate *pt*23. This gate operates when the counter *i*27/24 occupies its last position, in which the bistables *i*27 and *i*24 are in position 1. It then provides an earth potential. When the counter *i*27/24 leaves its position 1001, at time, *hc*, as was just described above, the gate *pt*23 ceases to operate, and the counter *i*19/16 steps by one step.

At the next time *hd*, the bistable BJ is restored to position 0, the gate *pt*24 operates when it receives $\overline{X}$, *hd*, $\overline{BK}$.

All the bistables and the counter CP are in position 0, the section *i*27/24 of RG2 displays 0000, the section *i*23/20 still displays the same information, the section *i*19/16 displays the initial information increased by 1. The control logic LC happens to be in the same condition as after the loading of the registers RG2 and RG1, ready for a new reading operation which will concern, this time, individual units belonging to the next column. This operation starts, as before, by the setting into position 1 of bistable BK, at time $\overline{d0b}$. If no change of condition is ascertained, the next column is handled, and so on, until the counter *i*19/16 has reached the position 1111.

As was mentioned above, it is possible thus to scan 16 columns in succession, for the 16 positions which the counter *i*19/16 can adopt, and 40 individual units per column, that is in totality 640 individual units, without it being necessary to call the computer CL.

When the counter *i*19/16 is in position 1111, reading operation of the condition of the individual units is made normally with the help of time signals provided by DT and bistables BB to BE. Then, at time $\overline{d11c}$,the bistable BJ is set into position 1, and this causes the putting into use of the reading results stored in the row common units. This putting into use is accomplished normally and it will be assumed that no change of condition is detected.

Morever, during the last cycle, at time *hb*, when are being analyzed the reading results provided by the last row unit (address *i*27/24:1001), the gate *pt*25 operates (conditions *hb* BJ, *i*27, *i*24, *i*19/16) and makes the bistable FL pass into position 1.

Then, the processing is repeated of the information provided by the last row unit, until the counter CP passes into position 27. The signal $\overline{d27a}$ restores the bistable BK into position 0, at time *ha*. At the time *hb*, the reading results of the last row unit are analyzed once more for the last time. At the same instant the counter CP is restored to zero. At the next time *hc*, the counter *i*27/24 steps by one step and restores to 0000. Following this latter the counter *i*19/16 also steps by one step and also restores to 0000.

At this instant, the gate *pt*26 operates (conditions FL and $\overline{i24}$) and connects the conductor $\overline{X}$ to the earth. This will prevent, in *hd*, the resetting of BJ.

At the next time *hb*, the gate *pt*27 operates (conditions *hb*, $\overline{i24}$ and FL). It provides the earth onto the inlets 0 or 1 of the bistables of section *i*3/0 of register RG1, in order to store an information replacing the order code and characterizing the call at end of the scanning.

At next time *hc*, the gate *pt*28 operates (conditions *hc*, BJ, $\overline{BK}$, X) and makes the bistable B pass into position 1.

Immediately then, the gate *pt*1 operates and transmits a call signal along wire $\overline{di}$, in direction of computer CL, in order to indicate that the scanning is terminated.

At next time *hb*, the gate *pt*30 operates and restores the bistable BJ into position 0.

The control logic happens to be back into initial position with this difference that the register RG1 contains an end-of-scanning code. The computer CL will read this information, in a fashion which will be subsequently described. The absence of conditions $\overline{B}$ by preventing the operation of the gate *pt*12, interrupts the operation which will only be resumed upon a new order from the computer CL.

Now will be described the detection of a change of condition and the operation which results thereof. As was already indicated above, the results of a reading operation are first stored into the row units. Then, the bistable BJ is set into position 1 and, at each cycle of the clock, the reading result of the row unit designated by the counter *i*27/24 is called, is stored into the bistables *i*11/8 and analyzed with the help of gates such as *pt*17 controlling *pt*18 and *pt*19. If an individual unit has changed condition, one of the gates such as *pt*17 operates, so that *pt*18 provides a positive signal and that *pt*19 connects the conductor $\overline{X}$ to earth.

This takes place at time *hb* and, at next time *hc*, the absence of condition $\overline{X}$ blocks the gate *pt*21 and suspends the progressing of the row unit counter *i*27/24. Hence, as nothing else is modified in the operating process, the logic CL remains orientated upon the same row unit and will repeat, cycle after cycle, the same processing, until the counter CP reaches position 27 and that the bistable BK is restored to zero.

At the next time *hc*, the gate *pt*28 operates and makes the bistable B pass into position 1. The computer is called, through the wire $\overline{di}$, whereas the register RG2 contains the full address of the group of four individual units among which a change of condition has taken place and the register RG1 contains, in addition to the unchanged order code, the scanning results of these four individual units, stored by the bistables *i*11/4.

Finally, the bistable BJ is reset at next time *hb*, through the gate *pt*30. The logic LC is in waiting condition. The computer CL is to start reading the information stored by the registers RG1 and RG2. When this is done, in the manner which will now be described, it will just be necessary that: the computer rewrites the same data into the registers RG1 and RG2 (by increasing by one unit the row unit number, and possibly, the column number), repeats the scanning order and resets the bistable B, so that a new scanning operation should be started from the group of four next individual units.

The computer CL can at any moment take note of the contents of the registers RG1 and RG2 of logic LC. It accomplishes this reading operation, namely, in both cases of operation described above (end of scanning and detection of a change of condition), when the wire $\overline{di}$ is earthed by gate *pt*1, this indicates that the scanner is no longer in the process of operation and can provide scanning results.

To read the contents of the register RG1, the computer CL transmits to the scanner a positive potential along the wire *f*10. This potential is distributed to a set of 16 gates *pt*31. Twelve of these gates are on the other hand conditioned by the outlets $\overline{i11/0}$ of the bistables of register RG1; the other four are not used, within the scope of the present invention. The gates which also receive a positive signal from register RG1 operate and connect the earth potential to the corresponding outgoing conductors *ie*0/15.

The computer CL reads the information contained in the register RG2, in the same manner, by transmitting a positive signal along the wire *f*11, which renders conducting the gates *pt*33.

In order to complete, there will now be described how the computer CL can simply obtain the results of the scanning of a determined group of four individual units.

For this purpose, the computer stores into RG2 the address of this group and stores into RG1 a particular order (1010) which sets the bistables *i*3 and *i*1 into position 1, whereas *i*2 and *i*0 remain in position 0.

Because of the presence of condition *i*3, the bistable BK passes normally into position 1 and the operation starts as for a scanning operation. The reading operations take place and the row units will store each the condition of a group of four individual units. Then, the bistable BJ passes into position 1 and the utilization of the reading results begin. The address of the row unit contained in RG2 (*i*27/24) enables then the reading of the scanning results required by the computer CL.

These results are stored into the bistables *i*11/4 of register RG1 and analyzed. It has been described above that if a change of condition is detected, by means of gates *pt*17, *pt*18 and *pt*19, the conductor $\overline{X}$ is earthed. This leads to the blocking of counter *i*27/24, to the repeated processing of the scanning results considered, and, to the call of the computer CL, so that this latter should take note of these scanning results. In the present case, the same operating process is obtained with the help of gate *pt*34. This latter receives *i*3, $\overline{i2}$, *i*1, $\overline{i0}$ and provides an earth along the conductor X, whatever should be the condition of the individual units.

Hence, the scanning results of the group of four individual units designated by the address which is stored in the register RG2 by the computer CL are considered as expressing a change of condition. The operating process is exactly that one already described above when it was assumed that a change of condition had taken place. It ends up with the calling of the computer CL which can take note of the scanning results of the group of individual units considered.

It is understood the foregoing description of a specific embodiment of this invention is made by way of example only and is not to be considered as a limitation on its scope. All numerical values, namely, were provided to make the descriptions easier to understand and may change with every installation.

We claim:

1. An electronic scanner for determining the condition of a unit connectable to a switching network comprising a matrix made up of columns and rows defining crosspoints and comprising one conductor per column; means for selectively connecting a column conductor to a column current generator; a principal conductor and an auxiliary conductor per row; means for selectively connecting the conductors of one row to a row current generator; a detection transformer per row, having its primary winding connected between the row current generator and the row auxiliary conductor; means for testing the condition of an individual unit assigned to a crosspoint of the matrix; the primary winding of a saturable transformer of an individual unit connected, at each crosspoint, between the column conductor and the corresponding row principal conductor; a first reading-circuit common to a row and to which are connected the secondary windings of the saturable transformers assigned to the row for detecting voltage induced in the secondary of said transformer responsive to a current flowing through a column conductor and the primary winding of the transformer connected thereto; and a second reading circuit common to a row and to which is connected the secondary winding of the detection transformer of this row, said second reading circuit responsive to voltage in the secondary of the detection transformer of a row indicative of current flow from the row auxiliary conductor to the detection transformer primary and coincidence means responsive to voltage sensed by both said reading circuits to signal a change in condition at a crosspoint.

2. An electronic scanner as defined in claim 1 in which to each crosspoint of the matrix are assigned *m* individual units, and wherein there is provided: one principal conductor and *m* auxiliary conductors per row; *m* detection transformers per row; *m* primary windings of *m* saturable transformers connected, at each crosspoint, between the column conductor and the row principal conductor; *m* reading circuits common to a row and to which are connected, respectively, the *m* secondary windings of the *m* saturable transformers assigned to each crosspoint of the row; *m* display contacts connected, at each crosspoint, between the column conductor and the *m* row auxiliary conductors; *m* other reading circuits, common to a row and to which are connected, respectively, the secondary windings of the *m* row detection transformers; the $2 \times m$ reading circuits responsive to selection of one column and one row for providing signals indicating the condition of *m* individual units at the same time, whereby the scanning speed of the scanner is multiplied by a factor of *m* without however necessitating a corresponding increase of the complexity of the scanner's circuits.

3. An electronic scanner as defined in claim 2, wherein the rows are distributed into *p* groups of *n* rows, and in which there is provided *p* row units comprising each a row current source and means for selectively connecting this source to one of the *n* rows of the group, making up *p* submatrices each having its own row circuits and the same column circuits, permitting *p* reading operations simultaneously, one in each submatrix.

4. An electronic scanner as defined in claim 3, wherein each of the *p* row units comprises also a reading register receiving the outgoing signals from the submatrix row reading circuits and storing the concerned *m* individual units' reading results.

5. An electronic scanner as defined in claim 4, and further comprising a control logic namely made up of an address register displaying the identify of a crosspoint of the matrix and of a time allotter operating per cycles and providing, during a cycle, the various necessary signals for controlling the execution of operations which relate to the reading of condition of one or several *m* individual units assigned to the crosspoint whose identity is stored into the address register.

6. An electronic scanner as defined in claim 5, wherein the cycle of the time allotter comprises two parts: a first part during which the time allotter provides the necessary signals for controlling the current supply of one column conductor and of the conductors of a row of each submatrix, as well as for controlling the storing of the reading results by the reading registers of the various submatrices row units; and a second part during which the reading results of the various submatrices are processed in succession for the purpose of detecting and signalling the changes of condition, the duration of the time allotter cycle being constant and started cycle always being accomplished in full; the row and column circuits of the matrix always have therefore all this duration at their disposal for accomplishing their operation and then restore to rest condition.

7. An electronic scanner as defined in claim 6, wherein there is an analysis register such that during the second part of the time allotter cycle, a part of the address contained in the address register is used jointly with a first time-signal for interrogating the reading register of a row unit and to read the corresponding reading result which is written into said analysis register of the control logic, and is immediately subject to an analysis through the circuit of a change of condition detector, the result of this analysis then conditions the sending to the address register of an order to step forward, obtained from a second time signal and having for result to increase by one unit the said address part so that this latter provides the number of the next row unit to be interrogated; these two time signals are repeated, at least as many times as there exist row units, this makes it possible to interrogate them in succession if there is no change of condition; whereas, if a change of condition is detected, the address remains the same and the same row unit is interrogated in repeated fashion until the end of the time allotter cycle, and when the address part designating the row unit to be interrogated provides the number of the last one among them, the order to step forward is inhibited and the last row unit is interrogated in repeated fashion until the end of the time allotter cycle.

8. An electronic scanner as defined in claim 7, wherein means are provided for simulating the detection of a change of condition and inhibit thus the order to step forward, the corresponding row unit being interrogated in repeated fashion until the end of the time-allotter cycle, if the control logic has to read the condition of the individual units of only one particular crosspoint, when the time allotter reaches the end of an operation cycle and if no real or simulated change of condition has been detected, the address contained in the address register is modified, by the restoring to zero of the address part which provides the row unit number and by the addition of a unit to another address part which provides the column number; whereas all the elements of the control logic are restored into their initial condition so that a new reading and analyzing operation is undertaken, during a new full cycle of time allotter, and wherein when the time allotter reaches the end of an operation cycle and if a real or simulated change of condition has been detected, the address contained in the address register is held, as well as the reading results written in the analysis register; and the control logic suspends then its operation by producing a signal indicating that it holds useful information—information stored by the address register and the analysis register.

9. An electronic scanner as defined in claim 8, wherein means are provided for simulating a change of condition, at the end of the next cycle of the time allotter, when the address part which provides the column number is the address of the last column to be scanned, so as to make the scanning to stop, these means also providing particular signals which indicate that this stopping is effected, at end of the scanning, when no change of condition has been detected.